United States Patent Office 2,793,960
Patented May 28, 1957

2,793,960
SOIL STABILIZER AND SOIL TREATED THEREBY

Cornelius H. M. van Bavel, Ames, Iowa, assignor to Iowa State College Research Foundation, Inc., Ames, Iowa, a corporation of Iowa No Drawing. Application March 11, 1950,
Serial No. 149,211

7 Claims. (Cl. 106—287)

My invention relates to an improved soil stabilizer and soil treated thereby.

Soil stability is a major agronomic and engineering problem. In the case of agricultural soils, lack of stability leads to erosion, surface-sealing, and the development of poor structure throughout. It has been shown that erosive soils and soils with poor structure have less and smaller water-stable aggregates than non-erosive soils with a good structure. While cropping with grasses and legumes increases considerably the number and size of soil aggregates, this prevents simultaneous use of the soil for other crops and, in addition, is of temporary nature and does not last much more than one season.

The methods used to improve agricultural soils with respect to stability are not always feasible in soil engineering. Frequently soil structures for roads, runways, mole drains, dams and terraces are not sufficiently stable to withstand water and fail upon wetting. Yet the available methods of stabilization are not always effective for such applications.

It is therefore a general object of the present invention to provide an improved soil characterized by good water stability and an additive to make the same from ordinary soil.

Further it is an object of the present invention to achieve the above objects in a manner suitable for use in engineering as well as agricultural applications of soil.

Another object of the present invention is to provide a soil characterized by relatively permanent good water stability and an additive to make the same from ordinary soil.

The novel features which I believe to be characteristic of my invention are set forth with particularity in the appended claims. My invention itself, however, together with further objects and advantages thereof, will best be understood by reference to the following description.

In accordance with the present invention, the water stability of soil is increased by the addition thereto of a small quantity of a methyl-silicon halide, such as a methylchlorosilane or a methylbromosilane. Suitable specific compounds are: monomethylmonochlorosilane ($CH_3SiH_2Cl$), monomethyl dibromosilane ($CH_3SiHBr_2$), dimethyldichlorosilane (($CH_3)_2SiCl_2$), methyltrichlorosilane ($CH_3SiCl_3$), and methyltribromosilane ($CH_3SiBr_3$). I have found that a compound of this class, or a mixture of such compounds, adds greatly to the water stability of the soil to which it is added, whether the stability of the soil is measured by the common agronomic tests or the common engineering tests.

Example 1.—Treatment of agricultural soil

As an example of the treatment of agricultural soil in accordance with the present invention, airdry soil in its natural condition was treated with the vapors of a mixture two parts by weight of dimethyldichlorosilane and one part by weight of methyltrichlorosilane at a pressure of from 20 to 40 mm. of mercury. The soil sample was then tested for aggregate size by wet sieving and the following results were obtained:

SAMPLE #1

| Aggregate size in mm. | Percentage by Weight | | |
|---|---|---|---|
| | Check | 0.2% additive | 0.5% additive |
| 8.0–2.0 | 4.1 | 8.8 | 9.7 |
| 2.0–1.0 | 10.7 | 11.5 | 15.8 |
| 1.0–0.5 | 11.8 | 14.2 | 17.5 |
| 0.5–0.25 | 15.9 | 17.9 | 21.8 |
| 0.25–0.10 | 22.0 | 16.7 | 12.5 |
| 0.10–0.00 | 35.5 | 30.9 | 22.7 |
| Mean Weight Diameter in mm | 0.504 | 0.680 | 0.791 |

This sample was from a continuous corn plot.

SAMPLE #2

| Aggregate size in mm. | Percentage by Weight | |
|---|---|---|
| | Check | 0.2% additive |
| 8.0–2.0 | 6.7 | 18.0 |
| 2.0–1.0 | 4.8 | 7.4 |
| 1.0–0.5 | 7.8 | 9.2 |
| 0.5–0.25 | 19.5 | 13.2 |
| 0.25–0.10 | 16.2 | 11.9 |
| 0.10–0.00 | 45.0 | 40.3 |
| Mean Weight Diameter in mm | 0.541 | 1.044 |

This soil sample was from a corn plot in a three year rotation.

SAMPLE #3

| Aggregate size in mm. | Percentage by Weight | | |
|---|---|---|---|
| | Check | 0.2% additive | 0.5% additive |
| 8.0–2.0 | 6.7 | 20.9 | 24.8 |
| 2.0–1.0 | 5.7 | 9.0 | 9.3 |
| 1.0–0.5 | 14.1 | 13.7 | 12.8 |
| 0.5–0.25 | 24.8 | 23.4 | 21.2 |
| 0.25–0.10 | 27.0 | 22.0 | 17.5 |
| 0.10–0.00 | 21.7 | 11.0 | 14.4 |
| Mean Weight Diameter in mm | .638 | 1.071 | 1.754 |

This sample was taken from a corn plot in a three year rotation.

The results of the foregoing tests are comparable in terms of increased stability with the most beneficial agronomic treatment; namely, many years cropping in meadow. This will be evident from the following table which shows the results of the sieve testing technique applied to a soil similar to that of sample #3, above:

| Aggregate size in mm. | Percentage by Weight | | |
|---|---|---|---|
| | Rotation Corn | Rotation Meadow | Continuous Bluegrass |
| 8.0–2.0 | 4.0 | 7.8 | 31.1 |
| 2.0–1.0 | 3.3 | 4.5 | 15.7 |
| 1.0–0.5 | 8.5 | 8.9 | 14.0 |
| 0.5–0.25 | 25.0 | 19.3 | 15.9 |
| 0.25–0.10 | 32.7 | 27.5 | 12.8 |
| 0.20–0.00 | 26.5 | 32.0 | 10.5 |
| Mean Weight Diameter in mm | 0.417 | 0.574 | 1.783 |

Addition of approximately 0.5 part by weight of a methyl-silicon halide per 100 parts by weight of soil treated as described above provides an unexpectedly great reduction in the actual amount of soil loss through erosion. In fact, this relatively small quantity of additive reduces the rate of soil loss to an insignificant value as compared with loss of untreated soil.

The apparent reason for the large reduction in soil loss associated with a small quantity of a methyl-silicon halide appears to reside in the critical size of the soil aggregates produced.

The significance of the soil aggregate size on the soil loss is evident from the following table taken from actual field tests:

| Percentage of aggregates above 0.25 mm. size | Soil loss in tons per year and per acre |
|---|---|
| 32 | 38. |
| 42 | 18. |
| 51 | 10. |
| 60 | 0.3. |
| 62 | not measurable. |

From the above table it will be evident that the loss decreases sharply with greater proportions of particles over 0.25 mm. in size and that the loss becomes insignificant when the percentage exceeds about sixty percent.

In the case of the first sample mentioned above, the loss in tons per acre, under the same conditions as the above table is approximately 17 tons per acre per year, in the case of untreated soil, 9 tons per acre per year, in the case of treatment with 0.2 percent of the 2:1 mixture of dimethyldichlorosilane and methyltrichlorosilane and no appreciable loss when treated with 0.5 percent of the mixture. In this range the addition of the small quantity of treating material gives a very great improvement in the rate of soil loss, reducing it effectively to zero.

Methylchlorosilanes have an advantage in treating the soil in that they can be applied in the vapor state. Their low boiling point of from 64° C. to 72° C. permits their application by low pressure or by a stream of hot air and no solvent is necessary. In the case of higher boiling point methyl-silicone halides, a solvent or heated air may be used to apply the additive to the soil.

Example 2.—Treatment of engineering soil

The engineering performance of a soil when wet is usually measured by its plastic index which is the difference between the liquid limit moisture percentage and the plastic limit moisture percentage. The liquid limit moisture percentage is the moisture percentage at which the soil becomes a liquid and flows, under specified laboratory conditions. The plastic limit moisture percentage is the moisture percentage at which the soil becomes plastic and moldable, under specified laboratory conditions.

In treating the sample soils, a mixture of two parts by weight of dimethyldichlorosilane and one part by weight of methyltrichlorosilane was added to the soil as described under Example 1. The plastic indices of the soil samples were then found to be as follows:

| Soil | Treatment | | Reduction of plastic index in percent |
|---|---|---|---|
| | Check | 0.5% additive | |
| Sample A | 17.3 | 14.0 | 19 |
| Sample B | 8.1 | 6.9 | 15 |
| Sample C | 15.8 | 14.1 | 11 |
| Sample D | 48.5 | 39.8 | 18 |

It will be observed that the plastic index of the soil was substantially reduced.

As further examples of the treatment of soil in accordance with the present invention, the soil may be treated with monomethylmonochlorosilane ($CH_3SiH_2Cl$), monomethyldichlorosilane ($CH_3SiHCl_2$), monomethyldibromosilane ($CH_3SiHBr_2$), dimethyldichlorosilane (($CH_3)_2SiCl_2$), methyltrichlorosilane ($CH_3SiCl_3$) and methyltribromosilane ($CH_3SiBr_3$). These compounds can best be used in quantities approximating 0.5% by weight of the soil although the exact amount necessary to eliminate practically all soil loss varies with the nature of the soil and the specific methyl-silicon halide used.

The term "soil" as used in the foregoing specification and in the appended claims is intended to be understood in its ordinary meaning as referring to the surface layer of the earth, which consists of the withered mineral and rock fragments of diverse origin, mixed with decaying and decomposed vegetable and animal matter.

What I claim as new and desire to secure by Letters Patent of the United States is:

1. The method of stabilizing soil against the destructive action of water, comprising adding a methyl-silicon halide to soil in its natural aggregated state, and contacting said soil with said methyl silicon halide to increase the number and size of the water-stable aggregates therein.

2. The method of claim 1 in which said methyl-silicon halide is a methylchlorosilane containing from 1 to 3 methyl groups and from 1 to 3 chlorine atoms.

3. The method of claim 1 in which said methyl-silicon halide is dimethyldichlorosilane.

4. The method of claim 1 in which said methyl-silicon halide is monomethyltrichlorosilane.

5. The method of claim 1 in which said methyl-silicon halide is monomethylmonochlorosilane.

6. The method of stabilizing soil against the destructive action of water, comprising adding a methyl silicon halide to soil in its natural aggregated state, and contacting said soil with said methyl-silicon halide to increase the number and size of the water stable aggregates therein, said methyl silicon halide being selected from the group consisting of methyl-silicon chlorides and methyl-silicon bromides and being added in at least 0.5 parts by weight of said methyl-silicon halide per each 100 parts of soil contacted.

7. The method of claim 6 in which said methyl-silicon halide is a methylchlorosilane containing from 1 to 3 methyl groups and from 1 to 3 chlorine atoms, and said method being further characterized by the fact that said methylchlorosilane is added to said soil in the form of a vapor.

References Cited in the file of this patent
UNITED STATES PATENTS

| 2,281,810 | Stone | May 5, 1942 |
| 2,424,853 | Safford | July 29, 1947 |
| 2,474,704 | Thayer | June 28, 1949 |
| 2,510,661 | Safford | June 6, 1950 |
| 2,609,305 | Roediger | Sept. 2, 1952 |